United States Patent
Tartarilla et al.

[11] Patent Number: 6,091,868
[45] Date of Patent: Jul. 18, 2000

[54] FIBER OPTIC MAGNETIC SWITCH

[75] Inventors: Anthony Tartarilla, Rockaway, N.J.; Emil Meyer, Stroudsburg, Pa.; William Hughes, Blairstown, N.J.; Linda Speth, Mt. Bethel, Pa.

[73] Assignee: The United States of America as represented by the Secretary of the Army, Washington, D.C.

[21] Appl. No.: 09/208,034

[22] Filed: Nov. 25, 1998

[51] Int. Cl.$^7$ ........................................................ G02B 6/26
[52] U.S. Cl. ...................................... 385/19; 385/6; 385/16
[58] Field of Search ................................ 385/6, 16, 17, 385/18, 19, 20; 451/2

[56] References Cited

U.S. PATENT DOCUMENTS 5,934,971  8/1999  Thompson et al. ...................... 385/19 X

*Primary Examiner*—Phan T. H. Palmer
*Attorney, Agent, or Firm*—John F. Moran; Michael C. Sachs

[57] ABSTRACT

A fiber optic magnetic switch device comprising a fiber optic transceiver having a light source and a length of fiber optic cable for transmitting light to a fiber optic magnetic switch. The switch includes a magnet, a position biased shutter operably attached to the magnet, a pair of SMA type connectors positioned to align the shutter there between, a repelling orientation magnet positioned proximate the shutter to orient the shutter in a first, secured repelling orientation to allow light through the shutter and further operable to prevent passage of light through the shutter in a second, unsecured condition. An alarm signals the failure of light to be transmitted along the fiber optic cable and through the shutter. Alternatively, the device may include a second fiber optic cable operable between the transceiver and the alarm during operation of the device and positioned to activate the alarm upon interruption of light transmission therein such as when it is tampered with. In a preferred embodiment, the position biased shutter is spring loaded and the repelling orientation magnet is mounted on a surface, such that movement of the surface causes movement of the repelling orientation magnet to allow the spring to close the shutter.

9 Claims, 1 Drawing Sheet

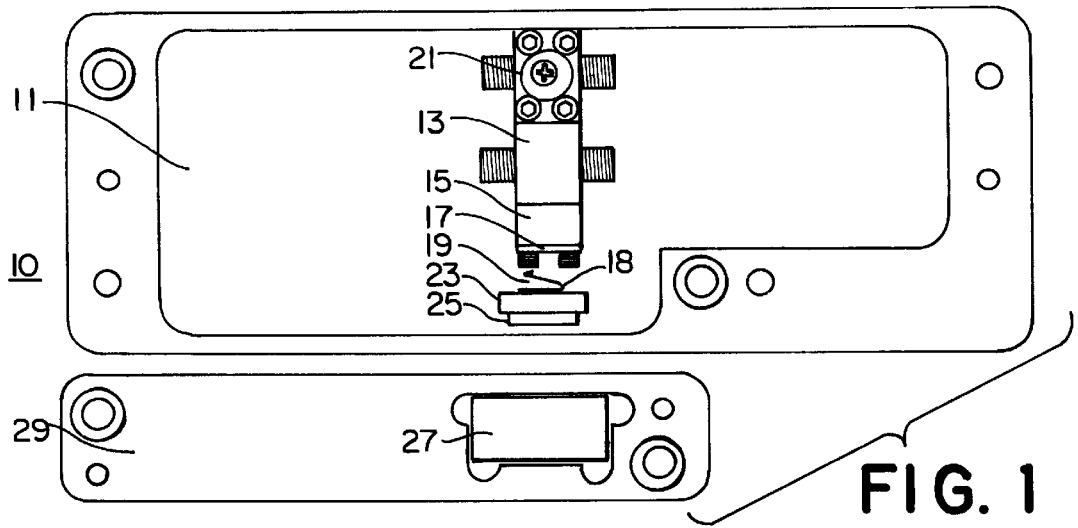
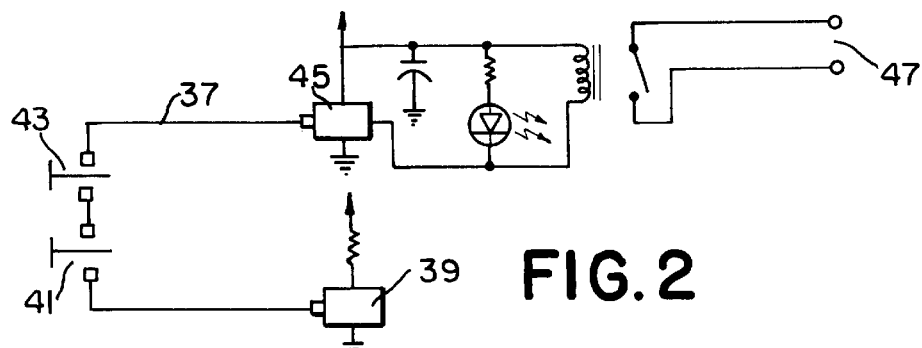
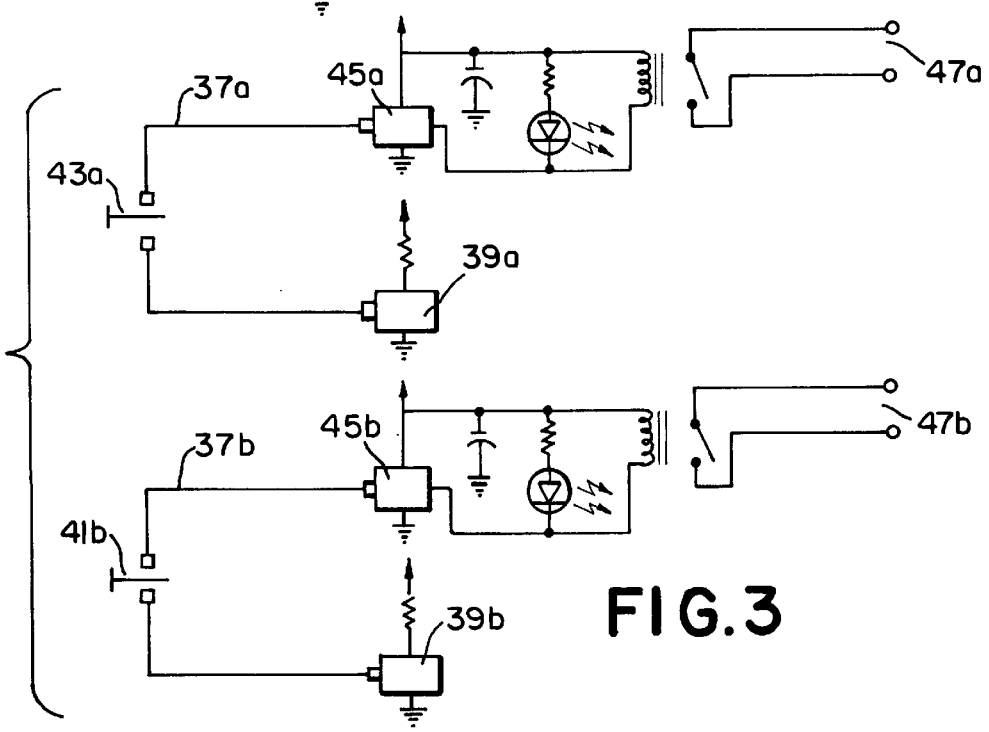

FIBER OPTIC MAGNETIC SWITCH

The invention described herein may be manufactured, used, and licensed by or for the U.S. Government for U.S. Governmental purposes.

FIELD OF THE INVENTION

The present invention relates to a fiber optic magnetic switch. More particularly the invention relates to a switch useful in systems where it is desirable or necessary to eliminate unprotected electrical paths into buildings.

BACKGROUND OF THE INVENTION

Intrusion detection is becoming more important as world events change and threats of major conflict are declining. A current concern is the theft of stored military equipment by small groups not capable of direct confrontation with the security of a facility.

Often storage of munitions and armaments is accomplished on military facilities where such equipment is stored in intruder safe building. However, such storage facilities are sometimes located near areas where military personnel work, train or are boarded. For that reason, extra precautions are needed against natural disasters.

Recently the military accepted a new lightening Standard AR 385-64. Under this new standard, any building that stores energetic material must conform to a rigid set of guidelines to insure that no unprotected electrical paths exist into the building. Of particular concern are existing switching devices such as the Balanced Magnetic Switch currently used in various intrusion detection systems on some government storage facilities. These switches transmit door status to a remote transceiver, and are not in compliance with the new Standard AR 385-64. In addition, these switches require electrical energy for operation and thus is not totally suited for isolated or remote facilities that have no electrical power.

Accordingly, one object of the present invention is to provide a switch for transmitting a change in condition without being electrically conductive.

Another object of this invention is to provide a switch that permits physical building security without violating Standard AR 385-64.

Yet another object of this invention is to provide a switch that increases tamper protection by eliminating possible use of a jumper across the switch.

A specific object of this invention is to provide switch that eliminates the need to bring electrical conductors into a secured structure.

Other objects will appear hereinafter.

SUMMARY OF THE INVENTION

It has now been discovered that the above and other objects of the present invention may be accomplished in the following manner. Specifically, an improved fiber optic magnetic switch device has been developed that for the first time meets Standard AR 385-64.

The device includes a fiber optic transceiver having a light source. Attached thereto for transmitting light is a length of fiber optic cable. Light is transmitted to a fiber optic magnetic switch which is the central feature of the present invention.

The switch of this invention is designed to eliminate the need to bring electrical conductors into a secured structure.

A position biased shutter is operably attached to a magnet such that the biasing means, preferably a small spring, attempts to move the shutter to a closed or second position in the path of the fiber optically transmitted light. A pair of SMA type connectors are positioned to align the shutter there between so that when the shutter is in the position of the biasing means, no light will pass to the connectors from the cable.

A repelling orientation magnet is positioned proximate the shutter to orient the shutter in a first, secured repelling orientation. The repelling forces of the magnet are great enough to force the magnet on the shutter to move the shutter against the bias of the spring load to allow light through the shutter.

In the normal, safe condition indicating no undesired activity, such as a door that has not been opened, the system operates continuously to transmit light through the fiber optic cable. When a second condition exists, such as when the door to which the system is attached is opened, the repelling orientation magnet is moved with the door, for example, and no longer operates to oppose the bias of the spring. As expected the spring causes the shutter to interrupt the light flow and an alarm is sounded.

The alarm also signals the failure of light to be transmitted along the fiber optic cable when, for example, it is cut or otherwise tampered with. Alternatively, the device may include a second fiber optic cable positioned to activate the alarm upon interruption of light transmission therein such as when it is tampered with.

BRIEF DESCRIPTION OF THE DRAWINGS

For a more complete understanding of the invention, reference is hereby made to the drawings, in which:

FIG. 1 is a schematic diagram of the preferred embodiment assembled for use;

FIG. 2 is a circuit diagram of one embodiment of the present invention; and

FIG. 3, is a circuit diagram of another embodiment of the present invention.

DETAILED DESCRIPTION OF THE PREFERRED EMBODIMENT

The present invention has many advantages over the prior art. Referring to FIG. 1, the device, 10 generally, includes an aluminum enclosure or box 11 in which the switch mechanism is mounted. An aluminum fiber optic block 13 has, in this embodiment, two different fiber optic switches, described below. Also included in box 11 is a tetrafluoroethylene block 15 that serves as a guide for the shutter, described below, and as a stop when the shutter is fully extended.

Aluminum spring retainer 17 holds spring 18 in position to bias the shutter 19 and to serve as a barrier between cap screws used to mount the device and the soft tetrafluoroethylene block 15. Shutter 19 engages a hole in block 13 when the compression of spring 18 is unopposed and prevents light from passing from the transmitter to the receiver. Spring 18 and shutter 19 allows light to pass in the compressed state. This is the alarm state or position for shutter 19, as described below. The shutter in the extended position prevents light from passing through block 13.

In this embodiment, a second shutter, not shown, is attached to tamper shutter button 21 such that when the cover to box 11 is in place, the tamper shutter button 21 is compressed and, again, light is allowed to pass from the transmitter to the receiver. Clearly, when someone opens the cover, tamper shutter button 21 is relaxed and its shutter blocks the light pass, thereby triggering an alarm. The present invention also has a tamper evident feature inherent in the device because light will not be transmitted by fiber optic cable that has been cut or otherwise disturbed, and the absence of light again causes the alarm to sound.

Magnet holder 23 holds the switch magnet 25 in place as shown in FIG. 1, and is also attached to shutter 19. When switch magnet 25 encounters the correct magnetic field, spring 18 is compressed and shutter 19 permits light passage, this being the secure state. A second magnet 27 is positioned in magnetic enclosure or box 29 in proximity to magnet 25. Magnet 27 has a repelling force (north pole if magnet 25 is a south pole, or the reverse) that repels shutter magnet 25, compresses spring 18 and causes shutter 19 to permit light to pass through block 13 as previously described.

In operation, box 13 is placed in a secure location proximate the object to be monitored, such as by a door, window or other moveable object. Box 29 is attached to the moveable object and positioned so that magnet 27 repels magnet 25, thus moving the shutter to permit the fiber optic system to transmit light to the receiver. A cover is also placed on box 13 so as to compress tamper shutter button 21 and indicate a safe state for the unit. At this point the object is securely deployed. The alarm, described below, is monitored either manually or mechanically at a monitoring station along with, for example, a plurality of the present invention devices or other intrusion detection devices. As can be seen from the foregoing, there is no electrical circuit and the device is capable of transmitting a change in condition without being electrically conductive.

FIG. 2 illustrates a circuit diagram using one embodiment of the present invention, where the fiber optic cable 37 is operably connected from transmitter 39 to magnetic switch 41 and a tamper switch 43 of the types shown in FIG. 1. When the object being monitored is in a secure position, light is transmitted to receiver 45 and processed to actuate alarm 47 in a conventional manner. Similarly, FIG. 3 illustrates two separate circuits with fiber optic cable 37a being used with the tamper switch 43a and fiber optic cable 37b being used with magnetic switch 41b.

While particular embodiments of the present invention have been illustrated and described herein, it is not intended that these illustrations and descriptions limit the invention. Changes and modifications may be made herein without departing from the scope and spirit of the following claims.

What is claimed is:

1. A fiber optic magnetic switch device, comprising:
    a fiber optic transceiver having a light source;
    a length of fiber optic cable for transmitting light from said source;
    a fiber optic magnetic switch for receiving said transmitted light, said switch including:
    a magnet;
    a position biased shutter operably attached to said magnet;
    a pair of SMA type connectors mounted in an aluminum block and positioned to align said shutter there between;
    a repelling orientation magnet positioned proximate said shutter to activate said shutter, said repelling orientation magnet being positioned to allow light through said shutter in a first, secured position and further operable to prevent passage of light through said shutter in a second, unsecured position; and
    alarm means for signaling the failure of light to be transmitted along said fiber optic cable and through said shutter.

2. The device of claim 1, which further includes a second fiber optic cable operable between said transceiver and said alarm means during operation of said device and positioned to activate said alarm means upon interruption of light transmission therein.

3. The device of claim 1, wherein said switch device is utilized in an intrusion detection system.

4. The device of claim 1, wherein said position biased shutter is spring loaded.

5. The device of claim 1, wherein said repelling orientation magnet is mounted on a surface, the movement of said surface and accordingly the movement of said repelling orientation magnet being the means by which said second, unsecured position is attained.

6. The device of claim 5, wherein said position biased shutter is moved to prevent passage of light through said shutter in said second, unsecured position by removal of said repelling orientation magnet from operable relationship with said magnet on said shutter.

7. A fiber optic magnetic switch device utilized in an intrusion detection system, comprising:
    a fiber optic transceiver having a light source;
    a length of fiber optic cable for transmitting light from said source;
    a fiber optic magnetic switch for receiving said transmitted light, said switch including:
    a magnet;
    a spring loaded shutter operably attached to said magnet;
    a pair of SMA type connectors mounted in an aluminum block and positioned to align said shutter there between;
    a repelling orientation magnet positioned proximate said shutter to activate said shutter, said repelling orientation magnet being positioned to allow light through said shutter in a first, secured position and further operable to prevent passage of light through said shutter in a second, unsecured position, said repelling orientation magnet being mounted on a surface, the movement of said surface and accordingly the movement of said repelling orientation magnet being the means by which said second, unsecured position is attained; and
    alarm means for signaling the failure of light to be transmitted along said fiber optic cable and through said shutter.

8. The device of claim 7, which further includes a second fiber optic cable operable between said transceiver and said alarm means during operation of said device and positioned to activate said alarm means upon interruption of light transmission therein.

9. The device of claim 7, wherein said spring loaded shutter is moved to prevent passage of light through said shutter in said second, unsecured position by removal of said repelling orientation magnet from operable relationship with said magnet on said shutter.

* * * * *